INVENTORS
A. A. STREKOPYTOV
P. I. ANDROSOV
BY
ATTORNEYS

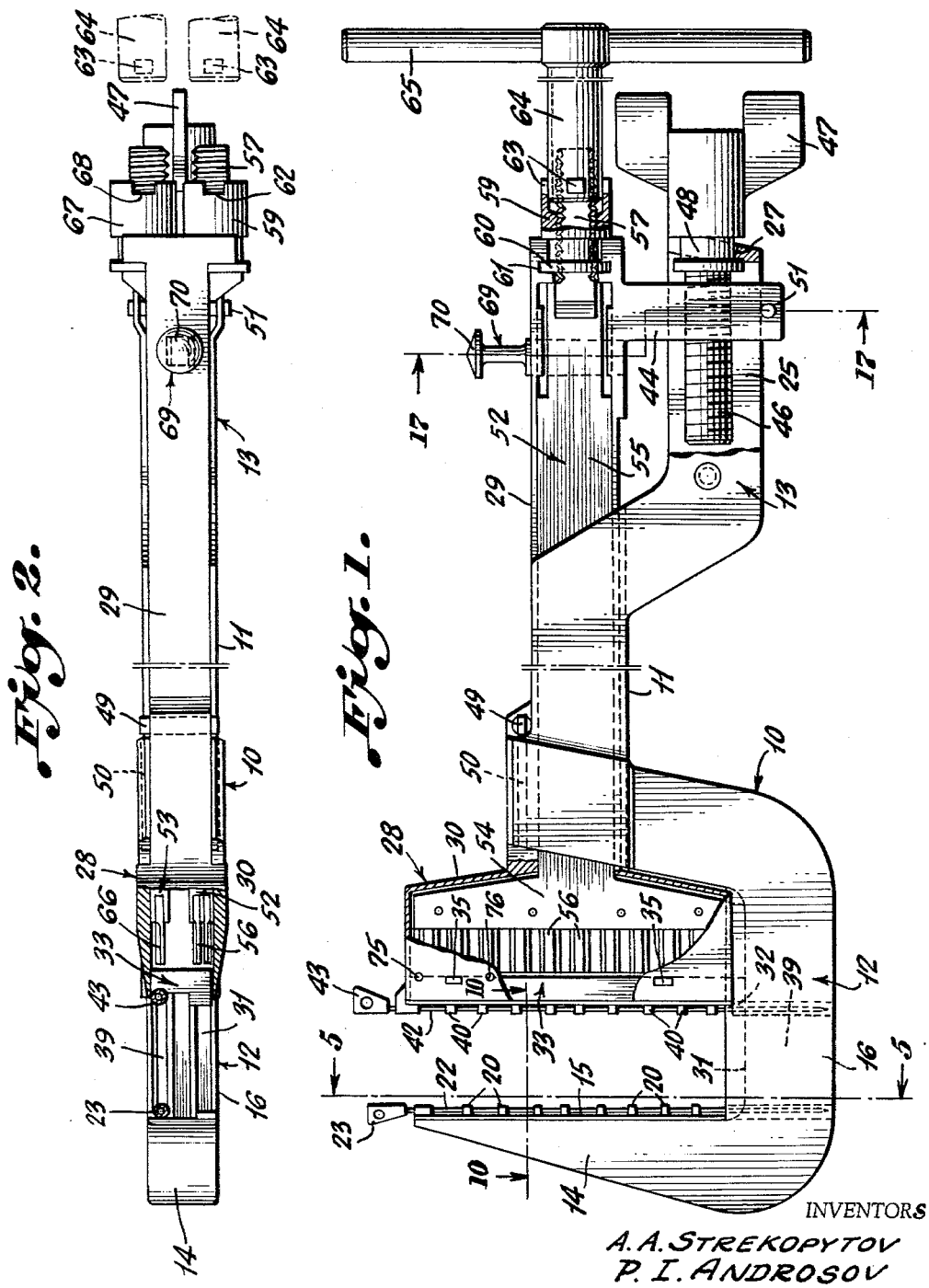

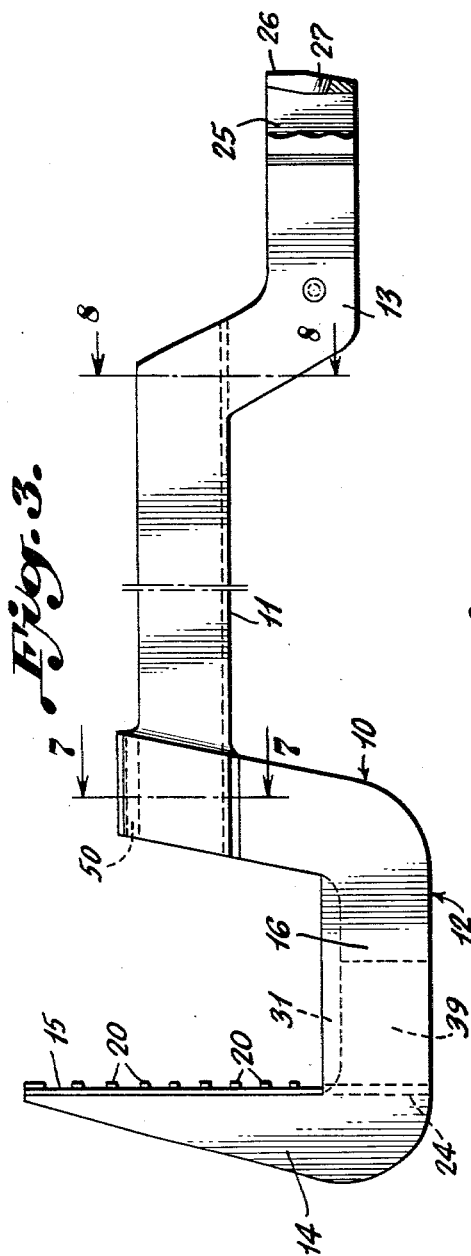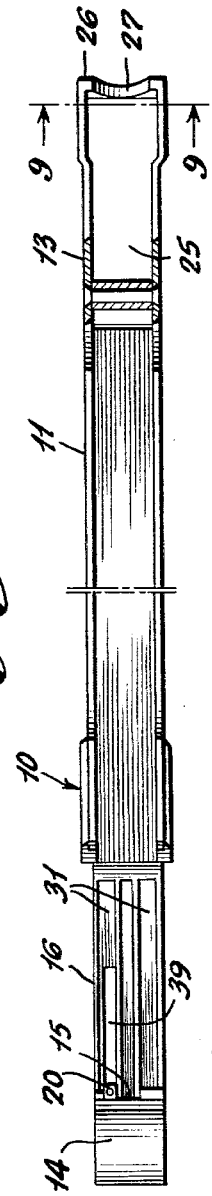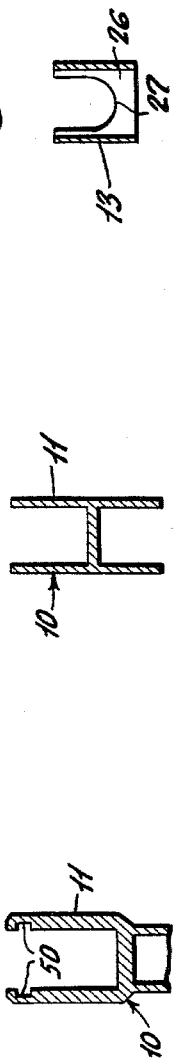
INVENTORS
A. A. STREKOPYTOV
P. I. ANDROSOV
ATTORNEYS May 24, 1966 A. A. STREKOPYTOV ETAL 3,252,643
INSTRUMENT FOR SUTURING LIVING TISSUE
Filed Dec. 24, 1962 5 Sheets-Sheet 3

May 24, 1966  A. A. STREKOPYTOV ETAL  3,252,643
INSTRUMENT FOR SUTURING LIVING TISSUE
Filed Dec. 24, 1962  5 Sheets-Sheet 4
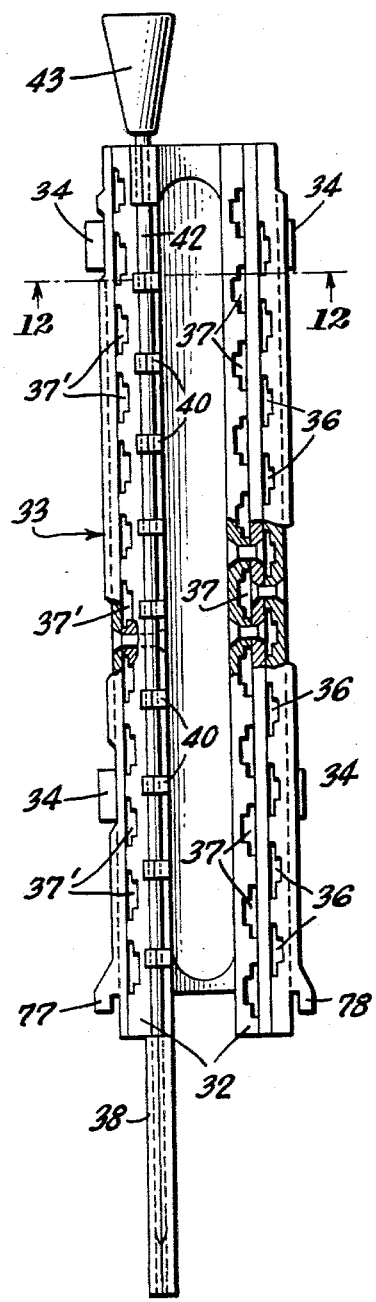
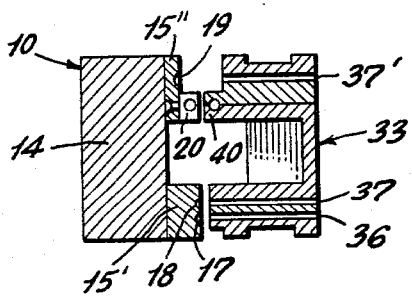
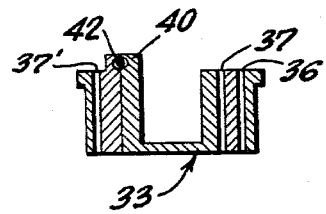
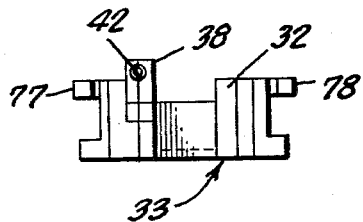
INVENTORS
A. A. STREKOPYTOV
P. I. ANDROSOV
BY Hancock, Downing & Seebold
ATTORNEYS May 24, 1966  A. A. STREKOPYTOV ETAL  3,252,643
INSTRUMENT FOR SUTURING LIVING TISSUE
Filed Dec. 24, 1962  5 Sheets-Sheet 5
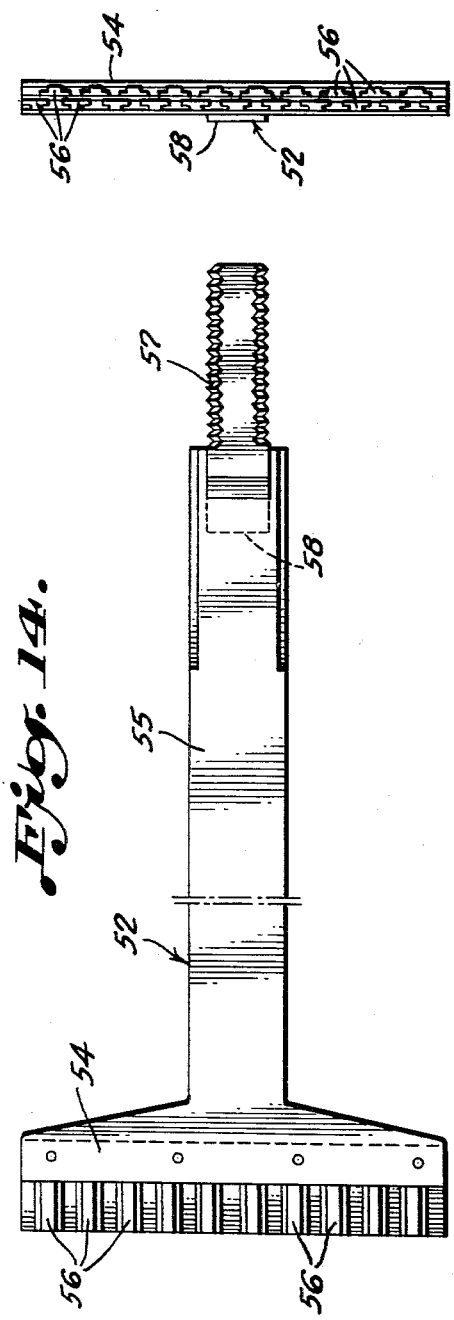
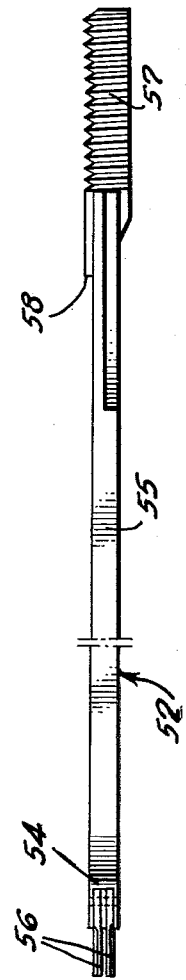
INVENTORS
A. A. STREKOPYTOV
P. I. ANDROSOV
BY
ATTORNEYS United States Patent Office 3,252,643
Patented May 24, 1966

3,252,643
INSTRUMENT FOR SUTURING LIVING TISSUE
Alexey Alexeevich Strekopytov, Vishnevskogo St. 10, Apt. 67, and Pavel Iosifovich Androsov, The 4th, Selskokhozaistrenny, Prolezd I/3, Apt. 267, both of Moscow, U.S.S.R.
Filed Dec. 24, 1962, Ser. No. 248,829
1 Claim. (Cl. 227—109)

This invention relates to surgery, and more particularly to an instrument for suturing organs and tissues by the use of metal staples.

Instruments of this general type have heretofore been provided for placing metal staple sutures in specific locations or in connection with specific organs, but none of these prior art instruments are useable in connection with a number of different organs, thereby necessitating the constant availability of a relatively large number of instruments in order to permit the performance of operations in different organs.

It is accordingly an object of this invention to provide a surgical instrument for placing metal staple sutures which is useable with many different organs such as the lung, stomach, duodenum and others in connection with operations involving such organs.

A further object of the invention is the provision of a surgical instrument for suturing by the use of metal staples, such instrument being so shaped and proportioned as to be easily useable in the suturing of various organs, and which requires a minimum of skill in the use thereof A still further object of the invention is the provision of a surgical instrument for suturing by the use of metal staples with which a single row suture, a double row suture or a three row suture may be placed to provide, for example, a double sunk suture with pleurization or peritonization of the sutured edge.

Another object of the invention is the provision of a surgical instrument for suturing by the use of metal staples, and including means for securing tissues with respect to the elements of the instrument in order to provide for sinking of the sutured edge with subsequent pleurization or peritionization of the edge.

A further object of the invention is the provision of a surgical instrument for suturing by the use of metal staples in which the tissues or parts of an organ to be sutured may be clamped in juxtaposition in order to provide for proper alignment of the sutures, and in which means is provided to prevent the application of undue force during such clamping operation, thereby preventing damage to the tissues or organs.

A still further object of the invention is the provision of a surgical instrument for suturing by the use of metal staples in which a replaceable staple magazine is provided in order to permit proper preparation of the instrument for a suturing operation, and also in order to permit rapid preparation of the instrument for subsequent suturing operations.

Further objects and advantages of the invention will be apparent from the following description taken in conjunction with the accompanying drawings, wherein:

FIG. 1 is a side elevational view with parts broken away and in sections for greater clarity, and showing a surgical instrument constructed in accordance with this invention;

FIG. 2 is a top plan view with parts broken away and in section, and showing the instrument of FIG. 1;

Figure 5:
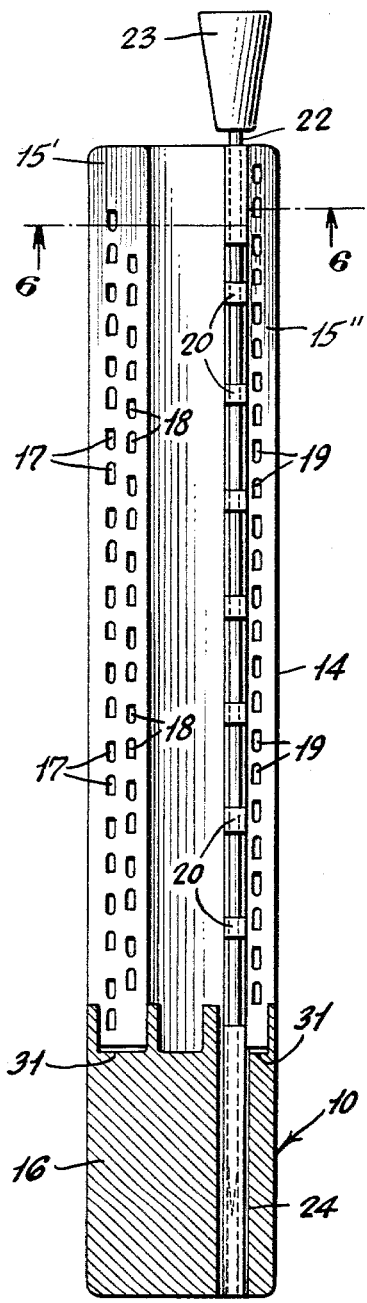
Figure 6:
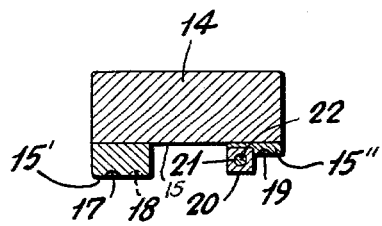

FIG. 3 a side elevational view showing the body of the instrument;

FIG. 4 a top plan view of the body shown in FIG. 3;

FIG. 5, a sectional view taken substantially on the line 5—5 of FIG. 1, and showing the jaw together with the recesses in the face thereof which provide staple clinching anvils;

FIG. 6 a sectional view taken substantially on the line 6—6 of FIG. 5;

FIG. 7 a sectional view taken substantially on the line 7—7 of FIG. 3;

FIG. 8 a sectional view taken substantially on the line 8—8 of FIG. 3;

FIG. 9, a sectional view taken substantially on the line 9—9 of FIG. 4;

FIG. 10, a sectional view taken substantially on the line 10—10 of FIG. 1, and showing the relationship of the jaw and staple magazine during a suturing operation;

FIG. 11, a front elevational view showing the staple magazine;

FIG. 12, a sectional view taken substantially on the line 12—12 of FIG. 11;

FIG. 13, a bottom plan view of the magazine shown in FIG. 11;

FIG. 14, a side elevational view of a pusher for ejecting a double row of staples from the magazine;

FIG. 15, a top plan view of the pusher shown in FIG. 14;

FIG. 16, a front elevational view of the pusher shown in FIG. 14; and

Figure 17:
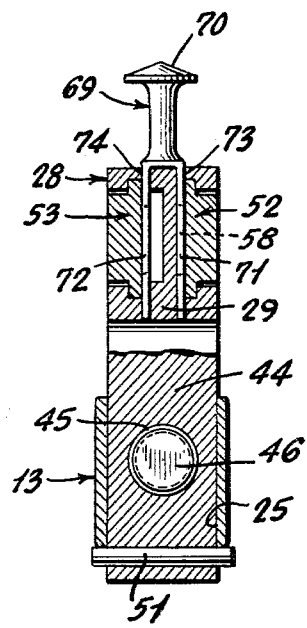

FIG. 17, a sectional view taken substantially on the line 17—17 of FIG. 1, and showing the means for limiting the movement of the staple ejecting pushers.

With continued reference to the drawings, there is shown a surgical instrument for placing sutures provided by metal staples constructed in accordance with this invention, and which may well comprise an elongated body 10 having a central upwardly opening channel portion 11 terminating at one end in a generally C-shaped portion 12, and the opposite end portion 13 being offset in the plane of the C-shaped portion 12. The C-shaped portion 12 serves to provide a jaw 14 having an inner flat surface 15, and the jaw 14 is connected to the central portion 11 of the body 10 by a web 16, as best shown in FIG. 5. Secured to the flat surface 15 of the jaw 14 are anvil members 15' and 15" and member 15' is provided with a row of recesses 17 and a closely adjacent parallel row of recesse 18. Recesses 17 and 18 provide clinching anvils for staples, and it is to be noted that the rows of recesses 17 and 18 are staggered with respect to each other in order that the staples will in effect overlap to provide a suture without gaps therein. The rows of recesses 17 and 18 are located adjacent one side edge of the jaw 14, and a third row of recesses 19 is in the member 15" provided adjacent the opposite side edge of the jaw 14 and the recesses 19 also provide staple clinching anvils for the purpose of placing a single row of staples to form a suture.

The jaw 14, as best shown in FIGS. 5 and 6, is provided with vertically spaced lugs 20 having aligned apertures 21 therein, and such apertures serve to receive a needle 22 having a finger-engaging knob 23 thereon, and the needle 22 may pass through tissues to retain the same in proper location with respect to the jaw 14. It is to be noted that the web 16 is provided with an aperture 24 in alignment with the apertures 21 in the lugs 20 to permit the insertion of the needle 22 from the opposite side of the instrument, if such is desirable.

The opposite end portion 13 of the body 10 is provided with an elongated opening 25 extending therethrough in the plane of the C-shaped portion 12, as clearly shown in FIG. 4, and the offset portion 13 terminates in an end wall 26 having a notch 27 therein, the purpose of which will presently appear.

A staple magazine holder 28 of generally T-shape is provided with a hollow shank portion 29 slidably received in the central channel portion 11 of the body 10, and the magazine holder 28 is provided at one end with a hollow head 30 disposed in the C-shaped portion 12 of the body 10 and opening toward the jaw 14. As shown in FIG. 5, the web 16 of the C-shaped portion 12 is provided with longitudinal grooves 31 which serve to slidably receive projections 32 on the lower end of a staple magazine 33, shown particularly in FIG. 11. The staple magazine 33 is provided with ears 34 on opposite sides thereof which are received in slots 35 in the head 30 for removably retaining the magazine 33 thereon.

As shown in FIG. 11, the magazine 33 is provided with two rows of staple receiving pockets 36 and 37 adjacent one side edge of the magazine 33, and such rows of staple receiving pockets are in alignment with the rows of recesses 17 and 18 in the anvil member 15'. A third row of staple receiving pockets 37' are disposed adjacent the opposite side edge of the magazine 33, and the row of pockets 37' is positioned opposite the row of recesses 19 in the anvil member 15''. A projection 38 on the lower end of the magazine 33 is received in a vertical opening 39 in the web 16 of the C-shaped portion 12.

Also provided on the face of the staple magazine 33 are a plurality of vertically spaced lugs 40 having aligned apertures therein which serve to receive a needle 42 having a finger-engaging knob 43 thereon, the needle 42 serving to pierce and retain tissues in proper position with respect to the magazine 33.

The shank 29 of the magazine holder 28 is provided with a transversely extending member 44 which projects through the transverse opening 25 in the offset portion 13 of the body 10, and the member 44 is provided with a threaded aperture 45. An adjusting screw 46 is threadedly received in the aperture 45, and the screw 46 is provided on the outer end thereof with a finger-engaging knob 47 having an annular groove 48 therein, which serves to receive the wall of the notch 27 in the end wall 26 of the offset portion 13 of the body 10. Consequently, it will be seen that upon rotation of the finger-engaging knob 47 and the adjusting screw 46 that the magazine holder 28 may be moved toward or away from the jaw 14. The magazine holder 28 may be releasably secured in assembled relationship with the body 10 by means of a key 49 slidably and removably received in keyways 50 in the body 10 and by a removable pin 51 extending through the member 44 and engaging the lower edge of the offset portion 13 of the body 10.

In order to remove the magazine holder 28 and associated elements from the body 10, it is only necessary to operate the knob 47 and adjusting screw 46 to move the magazine holder toward the right as viewed in FIG. 1 until the key 49 moves out of the keyways 50 to the position shown in FIGS. 1 and 2. Thereafter, upon removal of the pin 51, the magazine holder 28 including the head 30, shank portion 29 and associated elements together with the adjusting screw 46 and knob 47 may be removed upwardly from the channel portion 11 of the body 10.

It is to be noted that the staple receiving pockets 36, 37 and 37' in the staple magazine 33 are open at opposite ends, and in order to eject staples therefrom during a suturing operation there are provided two staple pushers 52 and 53.

Pusher 52 is of generally T-shape, having a head 54 and an elongated shank 55 slidably received in the shank 29 of the magazine holder 28. The pusher head 54, as shown in FIGS. 1, 14, 15 and 16, is provided with two rows of fingers 56 which are slidably received in the pockets 36 and 37, and the opposite end of the shank 55 of the pusher 52 is provided with a threaded member 57. A shoulder 58 is also provided on the shank 55 adjacent the screw threaded member 57, for a purpose which will be later described.

A nut 59 is rotatably mounted on the rear end of the shank 29 of the magazine holder 28, and the nut 59 is provided with an annular flange 60 received in a groove 61 in the shank 29 to permit rotation of the nut 59, but prevent longitudinal movement thereof with respect to the shank 29. The nut 59 is threadedly received on the threaded member 57, and is provided with slots 62 in the end thereof for receiving lugs 63 on a removable wrench 64 provided with a handle 65.

Rotation of the handle 65 will serve to turn the nut 59, and thereby move the pusher 52 toward or away from the magazine 33 to eject staples from the pockets 36 and 37.

The staple pushedr 53 is similar to the abovedescribed pusher 52, but it is to be noted, as shown in FIG. 2, that the pusher 53 is provided with a single row of fingers 66 which are slidably received in the pockets 37' for the purpose of ejecting staples therefrom. The pusher 53 is also provided on the opposite end with a threaded member which threadedly engages a nut 67 rotatably mounted on the shank 29 of the magazine holder 28 in a smiilar manner to the nut 59, and the nut 67 is also provided with slots 68 for receiving the lugs 63 on the wrench 64. Consequently, the wrench 64 may be utilized to rotate either the nut 59 or the nut 67 in order to actuate the corresponding pusher 52 or 53 to eject staples from the pockets in the staple magazine.

Since it is only desirable to eject the staples from the pockets of the staple magazine a sufficient distance to pierce the tissues and engage the ends of the staples with the anvil recesses in the anvil members 15' and 15'' for the purpose of clinching the staple, means is provided to limit the forward movement of the pushers 52 and 53 in order to prevent excessive movement thereof which might result in damage to the tissues after completing clinching of the staples. For this purpose, as shown in FIGS. 1 and 17, there is provided a U-shaped stop member 69 having a finger-engaging portion 70 and legs 71 and 72 which are removably received in slots 73 and 74 in the shank 29 of the magazine holder 28, as clearly shown in FIG. 17. When in place, the stop member 69 serves to prevent movement of the pushers 52 and 53 beyond a certain point, by reason of the fact that the shoulder 58 on the pusher 52 and a corresponding shoulder on the pusher 53 will engage the legs 71 and 72 of the stop member 69 to prevent funrther forward movement of the pushers 52 and 53. If further forward movement is desirable for some reason, the stop member 69 may be removed.

In certain types of operations, it may be desirable to secure an organ in place with respect to the magazine 33, and for this purpose openings 75 and 76 may be provided which extend through the magazine 33 and side walls of the head 30 of the magazine holder 28, and these openings 75 and 76 serve to releasably receive a generally U-shaped wire securing member somewhat in the shape of a hairpin, which may pass around the organ and retain the same in place. The U-shaped wire member is not shown, since the same is only utilized in certain types of operations, and per se forms no part of this invention. In utilizing the instrument of this invention, it is assumed that the desired pockets 36, 37 and 37' of the staple magazine 33 are filled with staples, and it is to be understood that any part or all of the pockets may receive staples in accordance with the suture to be accomplished. Having sterilized the complete instrument, the same may be deposited in the desired location for the suture, and the adjusting screw 46 is actuated by the finger-engaging knob 47 to move the staple magazine 33 toward the jaw 14 in order to clamp the tissues to be sutured between the staple magazine 33 and the face of the jaw 14. Also, if desired at this time the needles 22 and 42 may be inserted through the apertures in the lugs 20 and 40, at the same time piercing the tissues to retain the same in the desired location.

After placing of the instrument and clamping of the tissues between the staple magazine 33 and the jaw, if it is desired to place a double row of staples, the wrench 64 is applied to the nut 59, and rotated in order to move the pusher 52 forwardly, which will result in ejecting staples from the pockets 36 and 37 to pierce the tissues with the staples engaging the anvil recesses 17 and 18 in the anvil member 15' to clinch the same, after which operation the wrench 64 may be rotated in the opposite direction to withdraw the pusher 52.

If only a single row of staples is to be inserted, or a single row in addition to the above-mentioned double row, the wrench 64 is applied to the nut 67, and upon rotation of the same the pusher 53 will move forwardly to eject staples from the pockets 37' and pierce the tissues, with the staples engaging the anvil recesses 19 in the anvil member 15" to clinch the same. The pusher 53 is retracted in the same manner as described above for the pusher 52.

After completion of the suturing operation, the needles 22 and 42 may be withdrawn, and the staple magazine retracted away from the jaw 14 by appropriate rotation of the adjusting screw 46.

The staple magazine holder 28 may be conveniently removed from the body 10 as described above for cleaning or other purposes. The pushers may be removed from the magazine holder 28 by removing the nuts 59 and 67 therefrom, and of course the staple magazine 33 is removable from the magazine holder 28.

When necessary to prevent the jamming of tissues between elements of the instrument, overhanging lugs 77 and 78 may be provided on the lower end of the staple magazine 33 to engage over the sides of the web 16 of the U-shaped portion 12 of the body 10.

It will be seen that by the above-described invention there has been provided a relatively simple, yet highly effective surgical instrument for accomplishing various types of suturing operations utilizing metal staples placed in different selected arrangements, and which instrument may be utilized in connection with many different operations involving many different organs, which renders the instrument universal in nature, and eliminates the necessity for providing a relatively large number of individual special purpose instruments.

It will be obvious to those skilled in the art that various changes may be made in the invention without departing from the spirit and scope thereof, and therefore the invention is not limited by what is shown or described in the specification, but only as indicated in the appended claim.

What is claimed is:

A surgical instrument for placing sutures provided by metal staples, said instrument comprising an elongated body terminating at one end in a generally C-shaped portion, a central channel portion and the opposite end being offset in the plane of said C-shaped portion, said C-shaped portion providing a jaw having an inner flat surface, a row of recesses in said surface, said recesses providing staple clinching anvils, said offset end having an elongated opening therethrough in the plane of said C-shaped portion and an end wall having a notch therein, a staple magazine holder of generally T-shape having a hollow shank portion slidably received in said central channel portion, said hollow shank portion having a slot in at least one wall thereof, a hollow head on one end of said shank disposed in said C-shaped portion and opening toward said flat surface, a transverse member adjacent the opposite end of said shank having a threaded aperture therein, said member being disposed in said elongated opening, an adjusting screw received in said aperture and projecting through said notch, a finger engaging portion on said screw having an annular groove receiving the wall of said notch, whereby upon rotation of said screw said head will move toward or away from said flat surface, a staple magazine removably received in the open end of said head, said magazine comprising a generally rectangular block, a row of staple receiving pockets in said block open at opposite ends and in alignment with the row of recesses in said flat surface, a staple pusher comprising a generally T-shaped member having an elongated shank slidably received in the shank of said magazine holder, a shoulder on said elongated shank, a head on one end of said pusher having fingers slidably received in said row of pockets, a threaded member on the opposite end of said pusher, a rotatable nut received on said threaded member and fixed against longitudinal movement with respect to said magazine holder, and a removably stop member having a portion projecting through said slot into the path of movement of said shoulder, whereby upon operation of said nut to move said staple pusher to staple clinching position, said shoulder will engage said stop member to limit movement of said staple pusher and prevent damage to tissues.

References Cited by the Examiner

UNITED STATES PATENTS

| | | |
|---|---|---|
| 960,300 | 6/1910 | Fischer. |
| 2,891,250 | 6/1959 | Hirata. |
| 3,017,639 | 1/1962 | Sampson. |
| 3,078,465 | 2/1963 | Bobrov. |
| 3,079,606 | 3/1963 | Bobrov et al. |
| 3,080,564 | 3/1963 | Strekopitov et al. |

OTHER REFERENCES

Friedrich: Ein Neuer Magen-Darm-Nahapparat, from Zentrablatt fur Chirugie, 1934, No. 9, pages 504–506.

GRANVILLE Y. CUSTER, JR., *Primary Examiner.*

JORDAN FRANKLIN, *Examiner.*